(12) United States Patent
William et al.

(10) Patent No.: US 7,647,258 B2
(45) Date of Patent: Jan. 12, 2010

(54) DETERMINING TAXES BY APPLYING TAX RULES SPECIFIED USING CONFIGURABLE TEMPLATES

(75) Inventors: Isaac J. William, Santa Clara, CA (US); Harshavardhan Takle, Foster City, CA (US); Alexander O. Fiteni, Hayward, CA (US); Paulo Back, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1285 days.

(21) Appl. No.: 10/617,327

(22) Filed: Jul. 9, 2003

(65) Prior Publication Data
US 2004/0019540 A1 Jan. 29, 2004

Related U.S. Application Data

(60) Provisional application No. 60/398,767, filed on Jul. 26, 2002.

(51) Int. Cl.
*G06F 17/22* (2006.01)
*G06Q 20/00* (2006.01)

(52) U.S. Cl. .......................................... 705/31; 705/19
(58) Field of Classification Search .................... 705/30
See application file for complete search history.

(56) References Cited

U.S. PATENT DOCUMENTS

| 5,694,322 | A | | 12/1997 | Westerlage et al. ..... 364/464.27 |
|---|---|---|---|---|
| 5,987,429 | A | * | 11/1999 | Maritzen et al. .............. 705/31 |
| 6,064,983 | A | | 5/2000 | Koehler ....................... 705/31 |
| 6,128,274 | A | | 10/2000 | Mori et al. ............... 369/275.5 |
| 2003/0105687 | A1 | * | 6/2003 | Bross et al. ................... 705/31 |

* cited by examiner

*Primary Examiner*—F. Zeender
*Assistant Examiner*—Faris Almatrahi
(74) *Attorney, Agent, or Firm*—Park, Vaughan & Fleming LLP

(57) ABSTRACT

One embodiment of the present invention provides a system that is designed in a manner that processes used for determining or administering taxes for a transaction apply tax rules that are specified (by a tax user) using configurable templates. During operation, the system receives a transaction for which taxes are to be determined during which a process may require the application of rules. The system then examines a configurable template associated with a tax rule, wherein the configurable template identifies a set of attributes associated with the transaction. The system also examines a condition group for the set of attributes. If each condition of the condition group is satisfied, the system, by way of completing the said process, uses the process result that is associated with the condition group for the process.

34 Claims, 9 Drawing Sheets

| TAX | PROCESS | PRECEDENCE | DRIVER TEMPLATE |
| --- | --- | --- | --- |
| ICMS | TAX RATE DET. | 1 | SF-ST-PFC |
| ICMS | TAX RATE DET. | 2 | SF-ST |
| ICMS | TAX RATE DET. | 3 | PFC |

DETERMINING TAXES BY APPLYING TAX RULES SPECIFIED USING CONFIGURABLE TEMPLATES

RELATED APPLICATIONS

This application hereby claims priority under 35 U.S.C. §119 to U.S. Provisional Patent Application No. 60/398,767, filed on Jul. 26, 2002, entitled "Determining Taxes By Applying Tax Rules Specified Using Configurable Templates," by inventors Alexander O. Fiteni and Isaac J. William. The subject matter of this application is also related to the subject matter in a co-pending non-provisional application entitled, "Method and Apparatus for Providing a Tax Service that is Configurable for Local Jurisdictions," by Alexander O. Fiteni, Paulo V. Back, Isaac J. William, Harshavardhan Takle, Desh Deepak, and Roberto vono Silva, having Ser. No. 10/106,729, and filing date Mar. 26, 2002.

BACKGROUND

1. Field of the Invention

The present invention relates to computer-based systems for calculating and administering taxes. More specifically, the present invention relates to a method and an apparatus for determining taxes by applying tax rules that are specified using configurable templates.

2. Related Art

As companies expand their businesses beyond national borders and into the global marketplace, it is becoming increasingly harder to ensure that taxes are accurately determined. Determining taxes and managing tax compliance on a global scale is an enormously complicated task because each legislature with a right to levy taxes within its jurisdictional boundaries can establish its own set of taxes, as well as its own set of rules for regulating tax compliance. For example, in the United States alone there are over 6,000 individual jurisdictions that have the right to levy taxes, and perhaps that many more again worldwide.

The ad-hoc nature of the information required to calculate taxes makes codification and structuring of such information difficult. Consequently, existing computer-based systems for managing tax compliance are custom-built for each jurisdiction. This requires large amounts of programmer time to build systems for each jurisdiction, which can result in a considerable expense. Moreover, adding new countries or complying with new rules involves producing yet even more code, and consequently requires even more programmer time. Unfortunately, much of this programmer time is wasted because similar solutions are typically developed for each of the different jurisdictions.

Moreover, tax rules continually change for each jurisdiction. Hence, the underlying code for a computer-based tax management system must be continually modified to keep pace with these changes. At present, these changes are made at significant cost by a skilled programmer operating under the direction of a tax expert for each of the different jurisdictions.

What is needed is a method and an apparatus for determining taxes and managing tax compliance requiring little or no programming for individual tax jurisdictions. In other words, what is needed is method and an apparatus for determining taxes and managing tax compliance that can be configured by an expert in the field, such as a tax professional who may have little or no knowledge of computer programming.

SUMMARY

One embodiment of the present invention provides a system that determines taxes for a transaction by applying tax rules specified using configurable templates. During operation, the system receives a transaction for which taxes are to be determined. In the course of fulfilling the request for determining taxes, a process of a component may evaluate tax rules in order to return a result, which may be an intermediate result or a result that is directly requested. For such a process of a component to determine taxes, the system examines a first configurable template associated with a first tax rule, wherein the first configurable template identifies a first set of attributes. The system identifies a first set of conditions for the above-mentioned first set of attributes. For the first condition of the first set of conditions, the value of the attribute used in this first condition is compared with the value of the same attribute that is associated with the transaction using the comparison method specified. If the comparison is successful, this first condition is deemed to be satisfied and the next condition of the first set of conditions is evaluated in like manner. If each condition (of the first set of conditions) is satisfied, then the first set of conditions is deemed to be evaluated successfully, and the system uses the process result associated with this first set of conditions in determining a tax for the transaction; and the first tax rule is deemed to be evaluated successfully.

In a variation on this embodiment, if the first set of conditions is not satisfied and if an alternative set of conditions for the first set of attributes is satisfied, the system uses an the process result associated with the alternative set of conditions in determining the tax for the transaction; and the first tax rule is deemed to be evaluated successfully.

In a variation on this embodiment, if none of the sets of conditions (i.e., neither the first set of conditions nor an alternative set of conditions) is satisfied for the first set of attributes, then the first rule is not deemed to be evaluated successfully. The system attempts to evaluate any additional (alternative) tax rules for the same process of the component for determining taxes. Any additional (alternative) tax rules are considered in a sequence determined by a precedence ordering of the additional tax rules. This precedence ordering can be used by a tax user (i.e., a person with knowledge of the tax domain and entrusted with the responsibility of interpreting tax authority rules and setting them up as tax rules in the system) to have more specific tax rules evaluated (by the system) before more general tax rules are evaluated.

In a variation on this embodiment, the system allows a user to create configurable templates that can (subsequently) be associated with one or more tax rules.

In a variation on this embodiment, the system allows a user to modify the attributes used in creating configurable templates that can subsequently associated with one or tax rules.

In a variation on this embodiment, the system allows tax rules to be created that specify whether or not a specific tax is applicable to the transaction. In this embodiment, during the process of determining taxes, the component performs a tax applicability determination for a given tax.

In a variation on this embodiment, the system allows tax rules to be created that specify the tax rate that is to be used in determining the tax amount for a tax. In this embodiment, during the process of determining taxes, the component performs a tax rate determination for a given tax.

In a variation on this embodiment, the system allows tax rules to be created that specify a tax status of a tax. In this embodiment, during the process of determining taxes, the component performs a tax status determination for a given tax.

In other similar variations on this embodiment, the system allows tax rules to be created to specify the results of various processes, including a place of supply determination, a tax status determination, a tax recovery rate determination, a tax date determination, etc.

In a variation on this embodiment, the system allows tax rules to be created to specify the results of many processes in a single rule. For example, the system may allow a tax rule to be created to specify the (combined) results of tax applicability, tax status determination, and tax rate determination for each set of conditions of the configurable template associated with the rule.

In a variation on this embodiment, different sets of tax rules can be created for different local jurisdictions, such as tax regimes and taxes, and the configurable templates that are used can be different for different local jurisdictions.

In a variation on this embodiment, the system allows tax rules to be created for a hierarchy of tax regimes in such a way as to allow the specification of a general rule for a higher-level regime, and increasingly specific rules down the regime hierarchy and down to the level of taxes in the lowest level of regime.

This embodiment enables a user to avoid repeating rules which are generic for every tax. Instead, the user only define rules which are specific to a given tax and/or tax status, or a given tax and tax recovery type, for example at the lowest level.

In a variation the system allows tax rules to be defined for subscribers according to an open subscription model that allows sharing of rules across subscribers in a subscription hierarchy. This embodiment enables a user to avoid repeating rules which are generic for every subscriber. Instead, the user only defines rules which are specific to a given subscriber at the lowest level, while allowing a parent (i.e., a subscriber higher up in the subscription hierarchy) to define more general rules which may be shared.

In a variation on this embodiment, the system includes a database for storing the first tax rule, the first configurable template and the first set of conditions.

Table 1 illustrates different tax regimes, tax jurisdictions, and taxes for different countries in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices, such as disk drives, magnetic tape, CDs (compact discs) and DVDs, and computer instruction signals embodied in a transmission medium (with or without a carrier wave upon which the signals are modulated). For example, the transmission medium may include a communications network, such as the Internet.

Distributed Computer System

Figure 1:
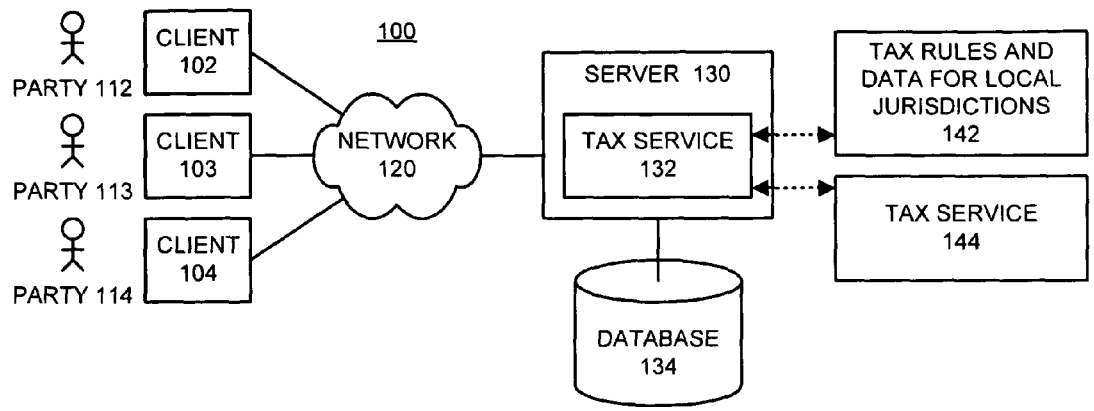
FIG. 1 illustrates a distributed computer system in accordance with an embodiment of the present invention.

FIG. 1 illustrates distributed computer system 100 in accordance with an embodiment of the present invention. Distributed computer system 100 includes a number of clients 102-104 coupled to a server 130 through a network 120.

Clients 102-104 can generally include any device on a network including computational capability and including a mechanism for communicating across the network. Clients 102-104 operate under control of parties 112-114, respectively. (Note that the term "parties" here refers to users of the computer system; it is not the same as the parties involved in taxable transactions.)

Server 130 can generally include one or more (interconnected) computing devices, including a mechanism for servicing requests from clients 102-104 for computational and/or data storage resources. Note that clients 102-104 and server 130 can generally include any type of computing device, including, but not limited to, a computer system based on a microprocessor, a mainframe computer, a digital signal processor, a portable computing device, a personal organizer, a device controller, and a computational engine within an appliance.

Network 120 can generally include any type of wire or wireless communication channel capable of coupling together computing nodes. This includes, but is not limited to, a local area network, a wide area network, or a combination of networks. In one embodiment of the present invention, network 120 includes the Internet.

Server 130 is coupled to a database 134, which contains data that is used by applications running on server 130. Note that these server-based applications may be running on behalf of remote applications on clients 102-104. Database 134 can generally include any type of system for storing data in non-volatile storage. This includes, but is not limited to, systems based upon magnetic, optical, and magneto-optical storage devices, as well as storage devices based on flash memory and/or battery-backed up memory.

Server 130 acts as a host machine for tax service 132. This allows applications running on clients 102-104 to make requests across network 120 to tax service 132 running on server 130. For example, an application running on client 102 can send a request to tax service 132 to perform the tax calculation, including determination of the local jurisdictions involved and, further, performing the computations necessary for each of the local jurisdictions.

Note that tax service 132 is configured so that it can optionally receive tax rules and data for local jurisdictions 142 from an external source, such as a tax expert for the local jurisdiction, prior to a request such as made by clients 102-104. Further, tax service 132 is configured to use tax rules and data received from an external source in servicing a request from a client. Furthermore, tax rules and data 142 can be encoded in a published format, such as extensible markup language (XML) or electronic data interchange (EDI) format, to facilitate receiving the tax rules and data 142 from different sources. Note that tax rules and data 142 can be communicated to tax service 132 across network 120.

Tax service 132 is additionally configured so that it can operate with an external tax service 144 provided by an external tax service provider. In this way, the external tax service provider can service the request with an operation (internal to tax service 144), such as a database lookup of a tax rate or a tax computation, in order to facilitate completing a tax operation for a specific jurisdiction by tax service 132. Furthermore, note that this external tax service provider may be located on a remote server that is accessible through network 120. A given request can be partially fulfilled by tax service 132 using tax rules and data 142 for one or more local jurisdictions, while using the tax service 144 of an external tax service provider to perform the computations for another local jurisdiction that might be simultaneously applicable.

Tax Service Structure

Figure 2:
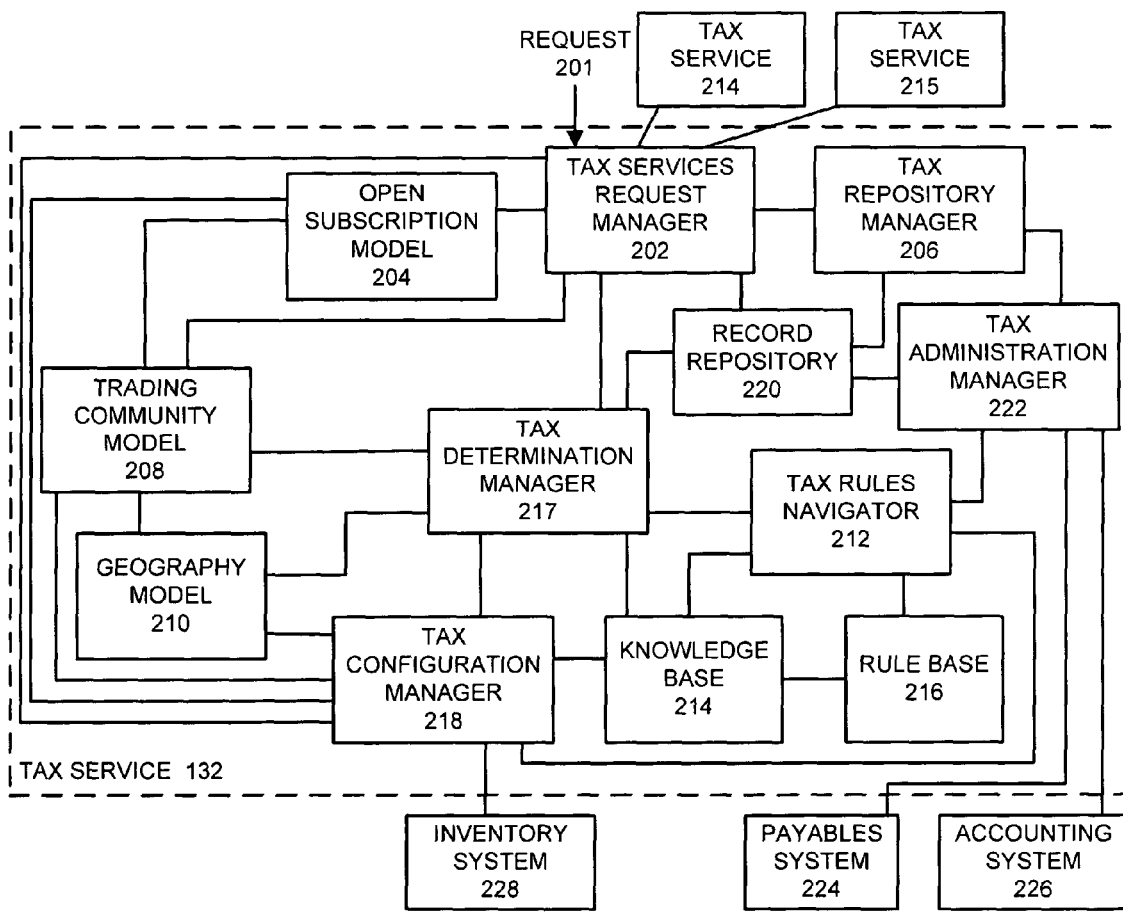
FIG. 2 illustrates the structure of a tax service in accordance with an embodiment of the present invention.

FIG. 2 illustrates the structure of tax service 132 in accordance with an embodiment of the present invention. Tax service 132 includes a number of modules, including tax services request manager (TSRM) 202, open subscription module 204, tax repository manager 206, trading community architecture (TCA) model 208, geography model 210, tax determination manager 217, tax rules navigator 212, tax configuration manager knowledge base 214, and rule base 216.

TSRM 202 generally manages interactions between external business transactions and tax processing operations. In one embodiment of the present invention, TSRM 202 is implemented as a set of published services that an external business application running on clients 102-104 may request. As is illustrated in FIG. 2, TSRM 202 receives a request 201 to perform a tax processing operation from an application running on one of clients 102-104.

Open subscription model 204 defines the security and access protocols used by TSRM 202 as well as tax rules navigator 212, tax determination manager (TDM) 217, tax configuration manager (TCM) 218 and tax administration manager 222. It also allows subscribers, such as parties 112-114, to select and receive services from either tax service 132 and/or various external service providers, such as tax service 144. During operation, open subscription module 204 communicates with trading community model 208, which represents various parties, sites and locations involved in the tax operations in a standardized format.

Tax repository manager 206 provides services that facilitate the storage into and retrieval of data from the record repository 220. These services are used by the tax determination manager 217 and tax administration manager 222.

Geography model 210 contains information about the geographical boundaries of the various jurisdictions associated with different tax regimes.

Tax configuration manager 218 provides services that can provide information from and/or can write information into, the geography model, the trading community model, an inventory system, tax services request manager 202, tax determination manager 217, tax rules navigator 212 and tax administration manager 222.

Tax rules navigator 212 facilitates access to tax data contained in knowledge base 214 and tax rules contained in rule base 216. Note that knowledge base 214 and tax rules 216 may actually reside within database 134 illustrated in FIG. 1.

Tax Service Operations Overview

Upon receiving a request 201 for tax processing, TSRM 202 uses the services of tax configuration manager 218 to identify the subscriber that will be used to plug into the open subscription model 204 to determine the data access and service subscriptions.

Tax determination manager (TDM) 217 is called by TSRM 202 to determine the local jurisdiction or jurisdictions for which tax computation needs to be performed. TDM 217 uses information from trading community model 208 and geography model 210 in ascertaining the local jurisdictions. Optionally, TDM 217 can use tax rules navigator 212 to access the necessary information contained within the knowledge base 214 and/or rule base 216.

After the local jurisdictions (for which tax must be computed) are identified, TSRM 202 invokes the services of either tax service 144 or TDM 217 to perform the computations for each of the identified local jurisdictions. In deciding whether to use tax service 144, TSRM 202 makes use of information in the open subscription model 204.

When the TDM 217 is used to perform the computations for one or more local jurisdictions, it makes use of services from tax configuration manager 218, trading community model 208 and geography model 210, as well as the tax rules navigator 212. (Tax rules navigator 212 is used to access relevant information from knowledge base 214 and rule base 216.)

TSRM 202 then invokes the services of TDM 217 to collect and summarize the information of the results of the various tax computations performed. In doing so, TDM 217 uses tax rules navigator 212 to access information from the knowledge base 214 and/or rule base 216. TSRM 202 then returns the information, summarized to the appropriate level as above, to the request 201.

Finally, depending on the setup within the TSRM 202 for the current event and the type of request 201, TSRM calls a service of tax repository manager 206 to store the results of tax processing performed for the request 201 by the system.

The above-described components work together to provide tax services as is described below with reference to FIGS. 3-6.

Details of the Operation of Tax Service

Figure 3:
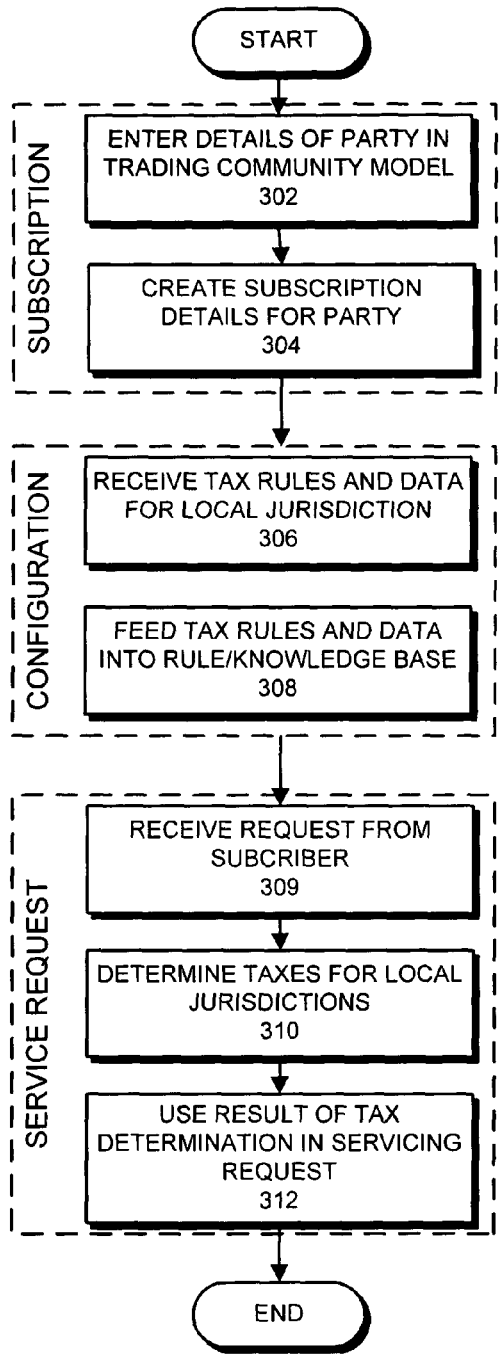
FIG. 3 is a flow chart illustrating operations performed by the tax service in accordance with an embodiment of the present invention.

FIG. 3 is a flow chart illustrating operations performed by tax service 132 in accordance with an embodiment of the present invention. The system initially captures details about the party, such as party 112, in the trading community model 208 (step 302) from a user operating on client, such as client 102. The user can further proceed to register the party, such as party 112, as a subscriber to the tax service 132 (step 304). In doing so, the system can register the subscriber to have access to one or more external services, such as tax service 144 and can enter other details such as data access and ownership privileges for one or more local jurisdictions.

The system can receive tax rules and data 142 for one or more local jurisdictions (step 306) through a data loading process. Or, a user can manually feed tax rules and data 142 into rule base 212 and knowledge base 214 using facilities provided by TDM 217 and TCM 218 (step 308). Or, a combination of both methods may be used to configure the system with data and rules.

Next, the system receives a request from the subscriber (step 309), wherein servicing the request may involve calculating a tax amount for one or more local jurisdictions. In response to this request, the system calculates the tax for each local jurisdiction that was identified above, by using the tax rules and tax data stored in knowledge base 214 and rule base 216 (step 310). The system subsequently uses a result of this calculation in order to service the request (step 312).

For example, the request from the subscriber may require the determination of taxes involving the sale of an item. To fulfill this request, the system first determines the local jurisdictions that need to be considered. In doing so, it may identify, for example, that a local sales tax is the only applicable tax, using the knowledge base 214 and, optionally, the rule base. The system could also determine the taxable basis and tax status for the local sales tax using the knowledge base 214 and again, optionally, use the rule base 216 to determine the taxable basis. Similarly, the system could lookup the tax rate from the knowledge base 214. The system may also determine that a reduced rate applies for the local sales tax, by applying a rule from rule base 216. Having the rate and the taxable basis, the system would then proceed to calculate the tax amount and perform any rounding that may be necessary. Then, the system can prepare the tax information for return to the transaction system that requested the service, and can record the information in the record repository if necessary. Note that the service request may be initiated by an external system while performing a financial or a billing transaction to complete the sale.

Unlike prior tax computation systems, the above-described system allows new jurisdictional rules to be implemented by merely loading additional data and rules independent of the system that uses its services. Time-consuming programming is not required to effect changes in tax rules. Also, there is little or no necessity on the part of the calling system to be aware of such changes.

Overview of Taxes and Jurisdictions

To understand what a jurisdiction is, a brief description and a few examples of jurisdictions are provided.

Each country can have one or more systems of taxation each of which deals with the taxation of specific aspects of a business transaction. For example, a "Sales" type of taxation system deals with the rules and regulations of how a sales transaction should be taxed. Similarly, a "Value Added Tax" (or, "VAT") type of taxation system deals with how the value addition in a manufacturing and/or sales lifecycle needs to be taxed. This system of rules and regulations is called a tax regime. A tax regime is implemented by one or more distinct charges. Each such specific charge is called a tax. Therefore, a regime may include one or more different taxes. The imposition of a tax is limited typically by a geographical boundary, in most cases around a contiguous political/administrative area, such as a city or a county. However, in some cases, a tax may be imposed, or may vary owing to belonging to a non-political demarcation, such as a free-trade zone. The incidence of a tax on a geographical area is called a tax jurisdiction.

A jurisdiction may be created for a country, a state within a country, a county within a state, or a city within a county. In certain cases, a jurisdiction may need to encompass, for example, a couple of cities; or, a county and an adjoining city belonging to a neighboring county. Or, as explained above, jurisdictions may be created for areas such as free-trade zones, export processing zones, etc.

TABLE 1

| Country | Tax Regime | Tax | Tax Type | Tax Jurisdiction |
| --- | --- | --- | --- | --- |
| United States | US Sales Tax | State Sales Tax | Sales Tax | California (State) |
| | US Sales Tax | District Tax | Sales Tax | San Francisco (City) |
| Canada | Canadian Goods and Services Tax | GST | VAT | Canada (Country) |
| | Canadian Goods and Services Tax | HST | VAT | New Brunswick (Province) |
| | Canadian Sales Tax | PST | Sales Tax | Ontario (Province) |
| Singapore | Singapore Goods and Services Tax | GST | VAT | Singapore (Country) |
| India | India Excise and Customs | Excise Tax | VAT | India (Country) |
| | India Excise and Customs | Additional Excise Tax | VAT | India (Country) |
| | India Excise and Customs | Customs Duty | Customs | India (Country) |
| Brazil | RICMS-Brazil ICMS Rules | ICMS | VAT | Sao Paulo (State) |
| | RICMS-Brazil ICMS Rules | ICMS-ST | VAT | Sao Paulo (State) |
| | RIPI-Brazil IPI Rules | IPI | VAT | Brazil (Country) |
| | RII-Brazil II Rules | II | Customs | Brazil (Country) |

TABLE 1-continued

| Country | Tax Regime | Tax | Tax Type | Tax Jurisdiction |
|---|---|---|---|---|
| Portugal | Portugal VAT | Domestic VAT | VAT | Portugal (Country) |
| Portugal | Portugal VAT | Inter-EU VAT | VAT | Portugal (Country) |

Table 1 illustrates different tax regimes, tax jurisdictions, and taxes for different countries. Table 1, reading from left to right, goes from the highest level to the most detailed level of granularity. There may be one or more tax regimes in a country; each regime can consist of one or more taxes; each tax is of a given tax type, which is a high level classification such as Sales Tax, Excise Tax and Mineral Oil Tax; and each tax can be levied in one or more tax jurisdictions (for one or more geographical elements).

Process of Determining Taxes using the System

Figure 4:
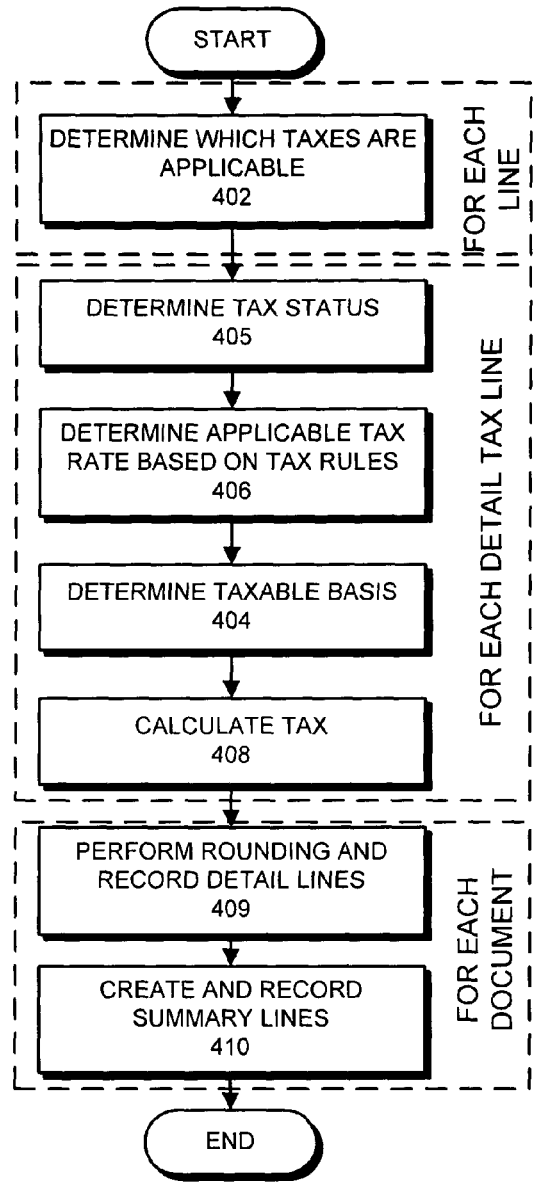
FIG. 4 is a flow chart illustrating the process of determining taxes in accordance with an embodiment of the present invention.

FIG. 4 is a flow chart illustrating the process of determining taxes in accordance with an embodiment of the present invention.

Process of Determining Applicable Tax Regimes

The system starts by determining which tax regimes are applicable (step 401) for each line of a document (for which request 201 is made).

Process of Determining Detail Tax Lines for a Tax Regime

For each tax regime determined applicable in step 401, the system (or, more specifically, TDM 217) determines the taxes and the tax jurisdictions that are involved, using the services of TCM 218, geography model 210 trading community model 208, knowledge base 214 and, optionally, the tax rules navigator 212 and tax rule base 216 (step 402).

TDM 217 creates a detail tax line and executes the steps 405, 406, 404 and 408, in that order, for each tax that is found applicable in step 402, utilizing other services and components as necessary.

TDM 217 determines the tax status for each applicable tax, using the knowledge base 214 and, optionally, the tax rules navigator 212 and tax rule base 216 (step 405).

TDM 217 then determines the tax rate, using the knowledge base 214 and, optionally, the tax rules navigator 212 and tax rule base 216 (step 406).

TDM 217 determines the taxable basis for each applicable tax, using the knowledge base 214 and, optionally, the tax rules navigator 212 and tax rule base 216 (step 404).

This enables TDM 217 to subsequently calculate the tax involved in the transaction (step 408).

Process of Recording, Rounding and Creation of Summary Tax Lines

The system executes steps 409 and 410, in that order, for the document for which request 201 was made.

Tax repository manager 206 performs the rounding, and records the detail tax lines.

Tax repository manager 206 then performs other necessary document level actions including the generation and recording of summary tax lines (step 410).

The system then enables the requesting transaction to view and/or receive and/or store the tax information, possibly along with other non-tax-related transactional information. The transaction may at a subsequent point use this information to pass to an accounting system (see 220 in FIG. 2) capable of interpreting the same and creating the relevant accounting entries.

Knowledge/Rule Base Creation Independence of Request Fulfillment

Note that the above-described system is modularized so that the means of acquiring the data in the knowledge base 214 and/or the rule base 216 do not affect the means of fulfilling a service request.

In other words, gathering, receiving and storing data in the knowledge base 214 and/or the rule base 216 can be accomplished by using a computer readable format, either procured from a third party (provider) or obtained from other sources, such as a tax authority (responsible for administering one or more taxes in the local jurisdiction). It can also be entered manually by a tax professional/end user.

Further, note that the external business transaction making the request 201 does not need to be aware of the origin (or the method of collection) of the data that was used in fulfilling the request.

Process of Determining Taxes Using Tax Services External to the System

The process of servicing requests, such as request 201, from a subscriber can involve performing all determinations and calculations using the system, as described in the preceding section (Process of Determining Taxes using the System).

Figure 7:
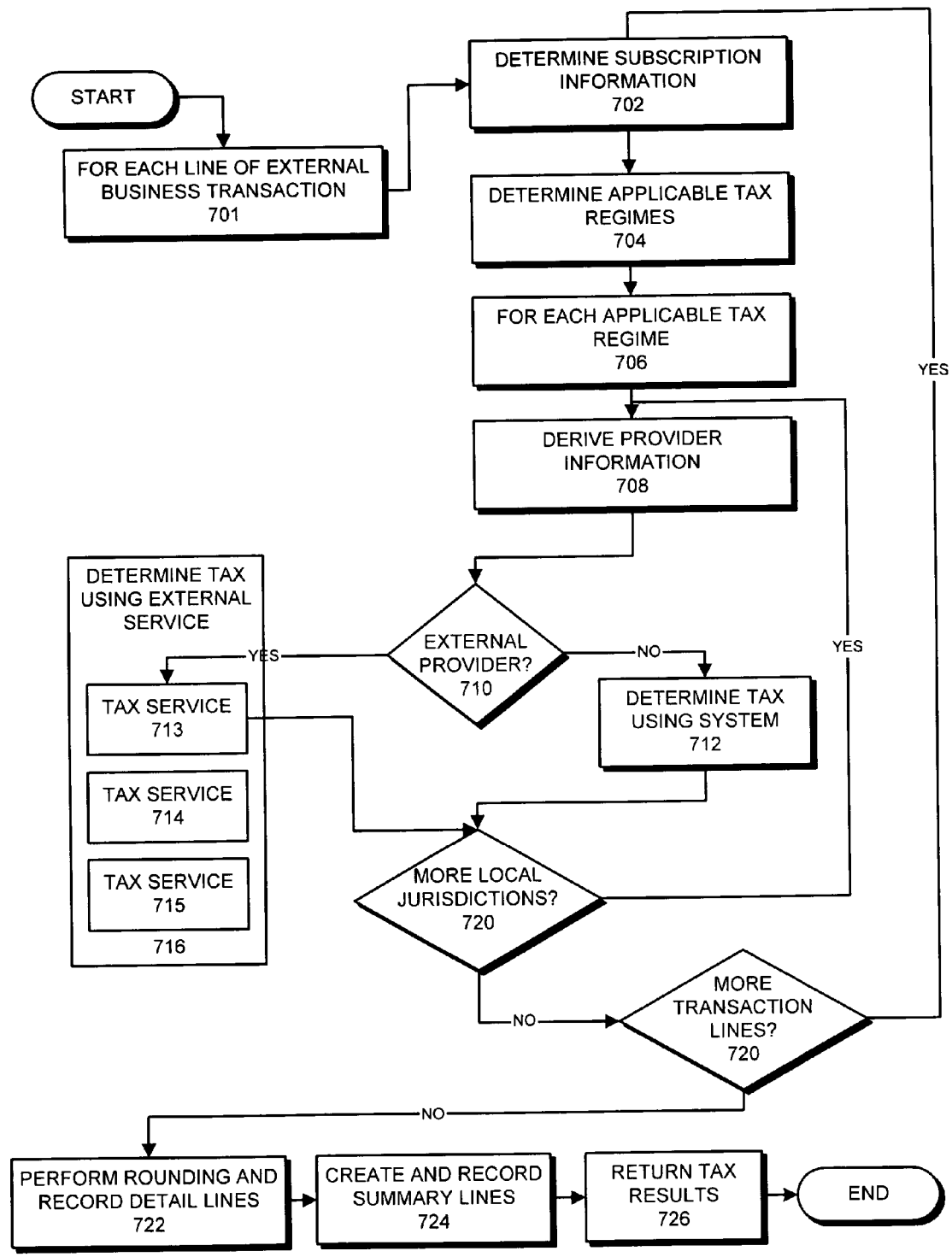
FIG. 7 is a flow chart illustrating the process of determining local taxes in accordance with an embodiment of the present invention.

Alternatively, request 201 may be fulfilled by utilizing tax determination and calculation services provided by one or more third parties, i.e., without using the tax determination and calculation services of tax service 132. As a variant, the system may also perform tax determination and calculation for certain jurisdictions using the services of the system while utilizing services provided by third parties for other jurisdictions. The process followed to service a request such as request 201 partially utilizing services of third parties is illustrated in FIG. 7.

This involves first determining all the tax regimes for which tax may need to be determined (704, 401). Next, for each tax regime, the system determines, using the Open Subscription Model (204), the identity of the third party—also called a "provider"—whose external service(s) 713-716, is needed to perform the determination and calculation for the tax regime (step 708).

If an external tax service such as tax service 713 is identified for a given tax regime (step 710), the system then sends a service request to the third party with the necessary details for the tax regime (713-716), and receives the tax details for the tax regime from the third party.

If no external tax service such as tax service 713 is identified for a given tax regime (step 710), the system determines taxes for the tax regime (FIG. 7, step 712) using TDM 217 primarily, along with other components and processes as described in Process of Determining Taxes using the System, and illustrated in FIG. 4, particularly steps 402, 405, 406, 404, and 408 (i.e., in the previous section entitled, Process of Determining Detail Tax Lines for a Tax Regime).

If there are other applicable tax regimes for the current line of the external business transaction (step 720), then processing begins for the next tax regime at step 708.

If there are no other applicable tax regimes for the current line of the external business transaction (step 720), then the system checks if there are any more transaction lines to be considered (step 721).

If there are any more transaction lines to be considered (step 721), the system begins processing for the next transaction line at step 701.

If there are no more transaction lines to be considered (step 721), the system begins processing at step 722 to perform actions at the level of the external business transaction or document.

Process of Recording, Rounding and Creation of Summary Tax Lines

Tax repository manager 206 collects, organizes and performs the rounding, and records the detail tax lines (steps 722, 409).

Tax repository manager 206 then performs other necessary document level actions including the generation and recording of summary tax lines (step 724, 410).

The system returns tax information (726) in the requisite level of summarization, thereby servicing the request, such as request 201.

Operations Performed by Tax Service

Figure 5:
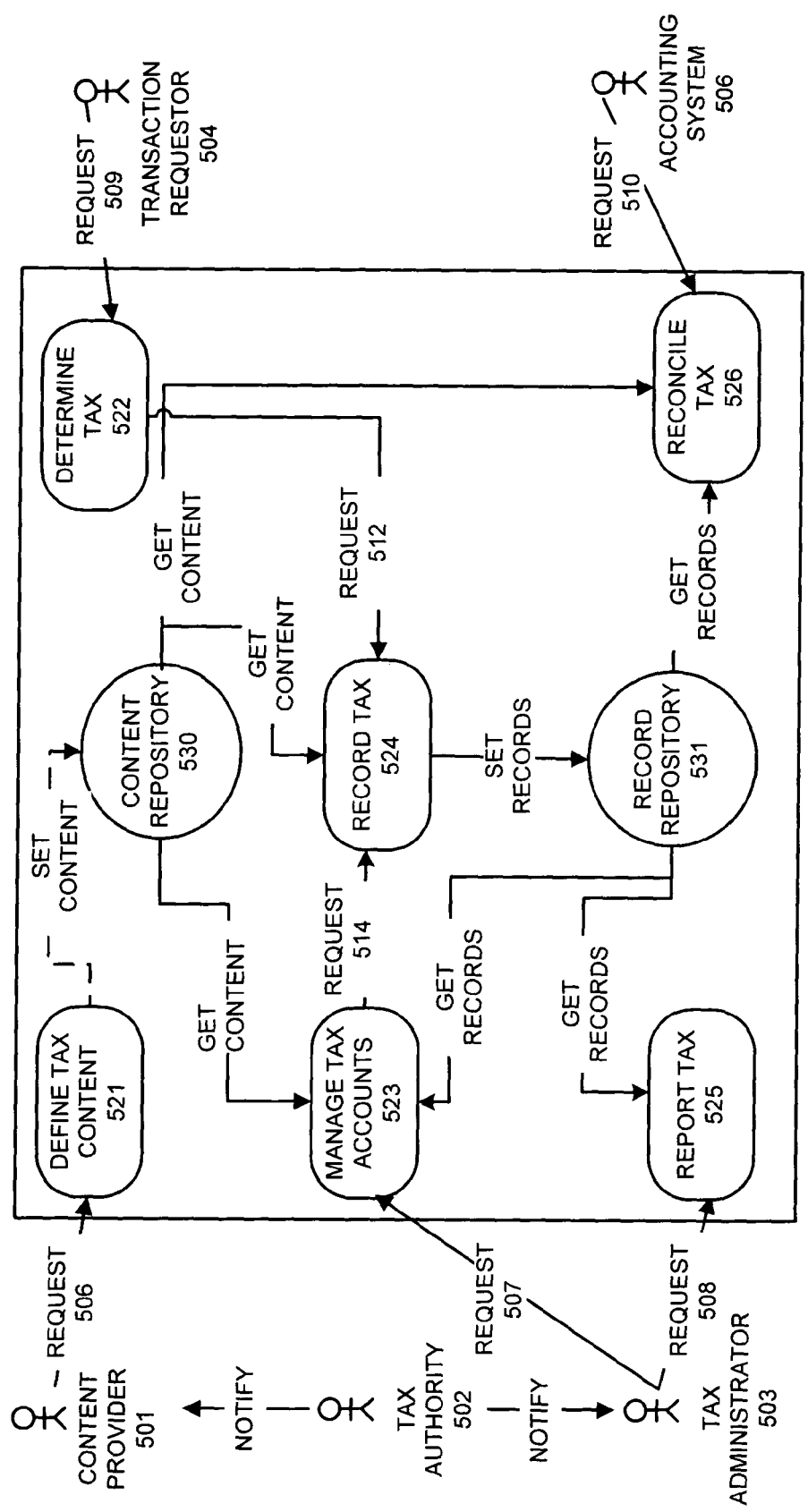
FIG. 5 is a diagram illustrating operations performed by the tax service in accordance with an embodiment of the present invention.

FIG. 5 is a diagram illustrating operations performed by tax service 132 in accordance with an embodiment of the present invention. The enterprise model illustrated in FIG. 5 represents the componentization of tax, that is, what tax is (as opposed to how it is implemented), and defines some key interactions. More specifically, FIG. 5 depicts a system that provides Tax Services, represented by the System Boundary and everything within it, and the outside world, represented by "actors" who interact with the system across the system boundary. An actor represents a person or system, external to the system under consideration, which interacts with the system in a specific role. For example, some of the actors in FIG. 5 are: Content Provider 501, Tax Authority 502, and Accounting System 506. Note that the processes defined within the box are essentially hidden from these actors.

The services provided by the system are the public face of the tax domain. Rather like an ATM machine, these services clearly announce what they will do. Moreover, clear instructions are provided on how to interact with tax service 132, and what to expect as an outcome.

To understand this diagram, consider an ATM as a system. Examples of actors are "Account Holder", "Maintenance Person" and "Currency Note Filler". External services are like the services that an "Account Holder" (actor) can avail of at an ATM—such as "Deposit Cash", and "Withdraw Cash". There may be different services available to other actors, such as, "Maintenance Person" and "Currency Note Filler". Internal Services are like "Debit Account", and "Confiscate Card" which cannot be seen by an actor.

Within the system boundary, the system providing tax services is composed of a number of services, such as the Define Tax Content service 521. The arrows emanating from an actor and which have "Request" alongside, are services which are "exposed" to the external world. Examples are manage tax accounts 523 and determine tax 522. Services such as record tax 524 are not allowed to be directly requested by an actor.

The services illustrated in FIG. 5 operate on a content repository 530 as well as a record repository 531. Content repository 530 includes knowledge base 214 and rule base 216. It is the primary source of tax information for tax services and includes knowledge about transaction-based taxes. A key interaction with content repository happens through the "define tax content" service 521, which is used to input data into content repository 530.

Record repository 531 stores information relating to tax events and tax status. It stores tax records along with any relevant changes to the tax records. Hence, it essentially contains the current, historical record of the results of interactions of the tax domain with the outside world. It also serves as a key source of information in: managing tax liabilities and assets with tax authorities; reporting taxpayer audit information on taxes collected or accrued; and in providing tax information for analysis and planning. An interaction with record repository 531 happens through the "record tax" service 524.

The "define tax content" service 521 provides methods to manage permanent definitions within content repository 530 for the tax domain. These methods can include adding, updating, disabling, purging, validating or listing data.

The "determine tax" service 522 uses information from both content repository 530 and record repository 531 to: determine the applicable taxes; determine the tax status for a given tax; determine the tax rate for a tax status of a specific tax; calculate the tax amount given the tax rate. It is composed of a number of internal services (not shown in the diagram), which make use of rules in the rule base 216 as well as the information contained in knowledge base 214.

The "manage tax accounts" service 523 provides a number of services to support administration, including the settlement of liabilities to a tax authority and recovery of amounts owed by a tax authority. The manage tax accounts service 523 may additionally maintain cumulative fiscal balances for a taxpayer and the current balances in tax authority specified registers.

The "record tax" service 524 is used to maintain record repository 531. It is typically called by other services, such as determine tax service 522 and manage tax accounts service 523.

The "report tax" service 525 manages and responds to the various reporting needs that a tax domain management system may have to fulfill in order to support tax administration. It generally enables the extract of raw data from record repository 531 in order to make it presentable to the outside world and/or adhere to format prescribed by a tax authority. Note that this raw data may be formatted into report form, or alternatively as a data set that is capable of being reformatted by a reporting tool.

The "reconcile tax" service 526 manages the process of reconciling the information in the record repository 531 with the information in an external accounting system. This is a requirement that a tax domain management system may have to fulfill in order to support tax administration in many local jurisdictions. It generally enables a tax user to identify the reasons why the accounting record of transactions is different from the tax record of transactions (as found in record repository 531).

Note that although FIG. 5 describes certain operations performed by Tax Service 132, only certain services have been described in detail.

Temporal View of Operations Performed by Tax Service

Figure 6:
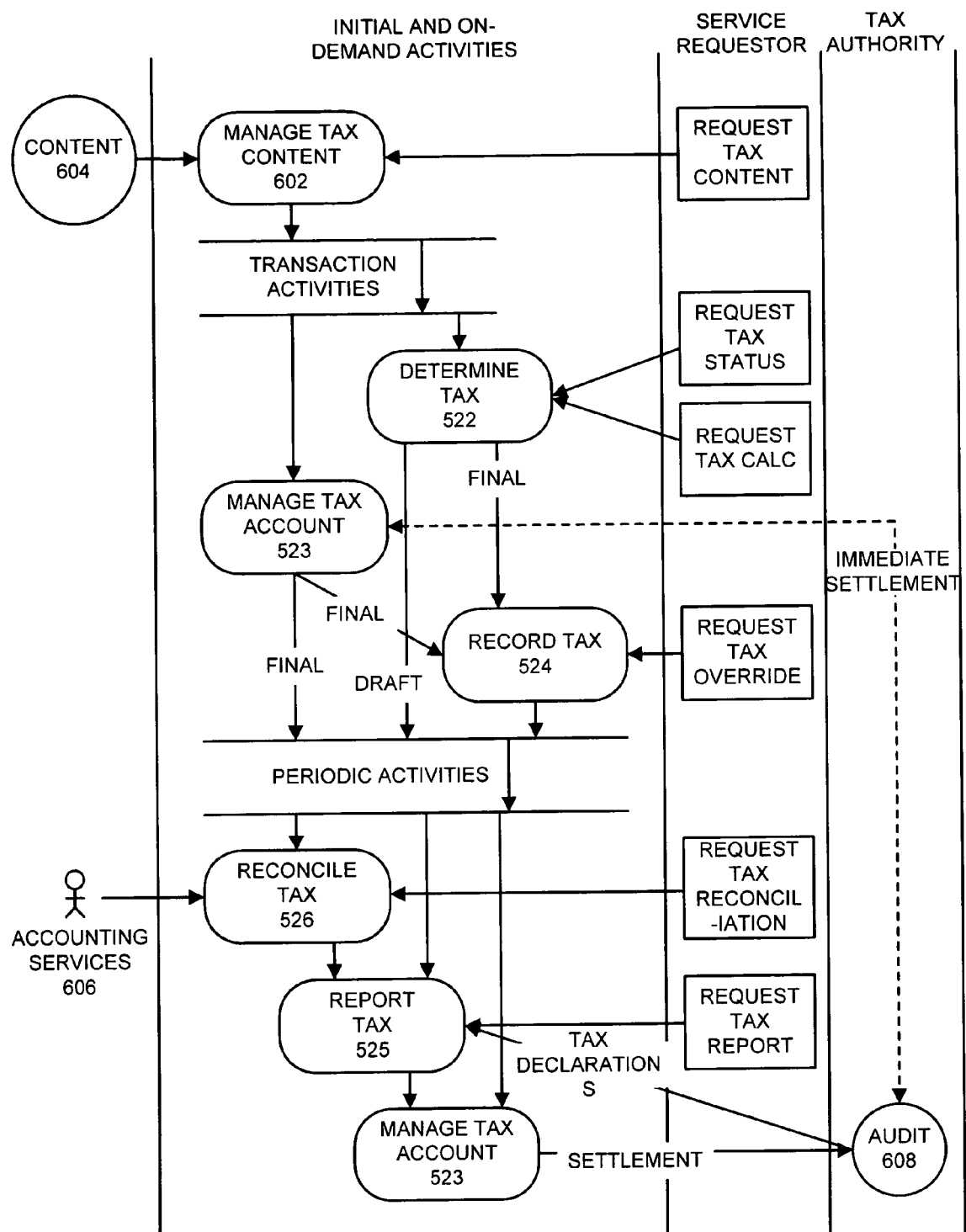
FIG. 6 is an activity diagram illustrating the temporal nature of operations performed by the tax service in accordance with an embodiment of the present invention.

FIG. 6 is an activity diagram illustrating the temporal nature of operations performed by tax service 132 in accordance with an embodiment of the present invention. FIG. 6 generally illustrates interactions that occur within the tax domain from the perspective of the three main "temporal" activities.

Note that diagram is split vertically into "swim lanes". The vertical bars between the swim lanes represent separation between actors. The passage of time is represented by vertical arrows from top to bottom. For example, a request to Determine Tax 522 happens after the request to Manage Tax Content 602 is completed. Horizontal lines represent a point in time. Activities represented by arrows flowing down to a horizontal line must be completed before any activity below the horizontal line can begin.

Each service can be accessed via an application programming interface (API), or alternatively through a message from an external requester. Once a request is passed to a service, the service is responsible for determining the relevant actions needed to fulfill the request.

A first set of activities are "occasional activities" that mainly involve setup and content management. These are actions that do not occur on a regular basis, and include actions such as purging, or requiring a service to upload revised or new tax information.

A second set of activities are "transaction activities" that occur more frequently and may require one or more services. These activities may include actions such as determining tax and managing tax account information. A third set of activities are "periodic activities" that are performed routinely at periodic intervals. These activities can include preparing tax declarations and remittances to tax authorities for a given tax period.

Using Rules to Determine Taxes

Overview and Definitions of Terms

The need for a tax rule base and a rule navigator is because tax authority rules/regulations are complex, typically needing the expertise of a person "skilled in the art," such as a user who knows about tax rules and regulations, etc. (i.e., a tax user) to interpret and apply such rules. Also, such tax authority rules and regulations are subject to change, and is not amenable to being programmed into software without incurring a high degree of software maintenance. It is therefore advantageous to store the tax authority rules as data. This allows a software program to interpret the data and to return the appropriate result (or results) to enable another component of a tax service to satisfy the requirements of the tax authority. The repository that houses the tax authority rules is called the "tax rule base," and the program that interprets the data (tax rules) is called the "tax rule navigator."

Since tax authority rules vary across the various tax regimes around the world, it is advantageous to employ a process of abstraction and to then identify atomic elements and concepts. The following concepts and components emerge from such as abstraction, and are defined in this section (process, driver, driver template, condition group, process result, and tax rule).

A process is a series of actions, changes, or functions, carried out either by a software program or a user, bringing about a result.

A driver is an input that affects the outcome of one or more processes. A driver may also be called a determining factor.

A driver template is used to group two or more drivers that may simultaneously affect the outcome of one or more processes. A driver template may also be called a driver set template.

A condition group, created using a driver template, refers to a (single) combination of values and conditions—one each for every driver in the driver template. Typically, a condition group can point to one or more process results. A condition group may also be called a driver set.

A process result directly (or indirectly) indicates the outcome of a specific process.

A tax rule specifies the driver template to use to attempt to arrive at a process result for a specific process.

Figure 8:
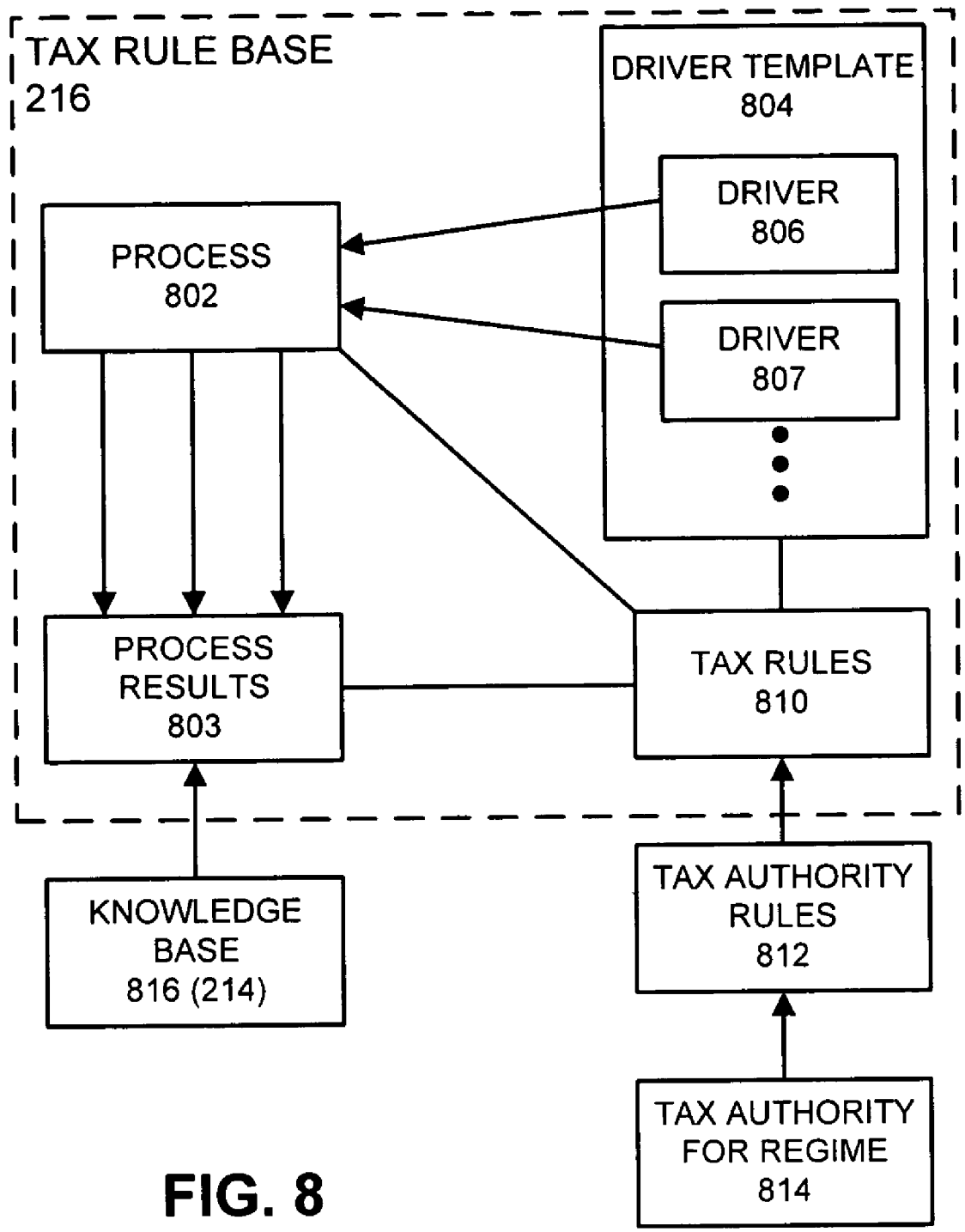
FIG. 8 illustrates how tax rules are applied to a process involved in determining taxes in accordance with an embodiment of the present invention.

FIG. 8 illustrates how tax rules are applied in a process involved in determining taxes in accordance with an embodiment of the present invention. As is illustrated in FIG. 8, a tax authority 8714 for a tax regime promulgates a set of tax authority rules 812. Note that the tax authority 814 is the entity to which taxes are paid and/or are reported to. Tax authority rules 812 are abstracted into a form that is suitable for interpretation by a computer system to produce a set of tax rules 810.

Each rule in the set of tax rules 810 points to one or more drivers for a specific process. FIG. 8 illustrates how a driver template 804 contains a number of drivers including drivers 806-807. A driver is an attribute of a transaction that acts as an input to a process. For example, "fiscal classification" can be a driver for a "determine which taxes are applicable" process (see step 402 in FIG. 4).

When all of the drivers for a process 802 satisfy pre-specified conditions, one process result 803 per successful set of conditions can be returned as a result. These process results are used to arrive at a result for processes of tax determination and tax administration. For example, a "determine applicable tax rate" process can be configured to store a tax rate of 12% when a given set of conditions is successfully evaluated. During the course of attempting to determine the tax rate (see step 406 in FIG. 4), the "determine applicable tax rate" process (406) may need to navigate through rules to derive the rate. Another example of a process is a "determine taxable basis" process (see step 404 in FIG. 4).

Figures 9, 10:
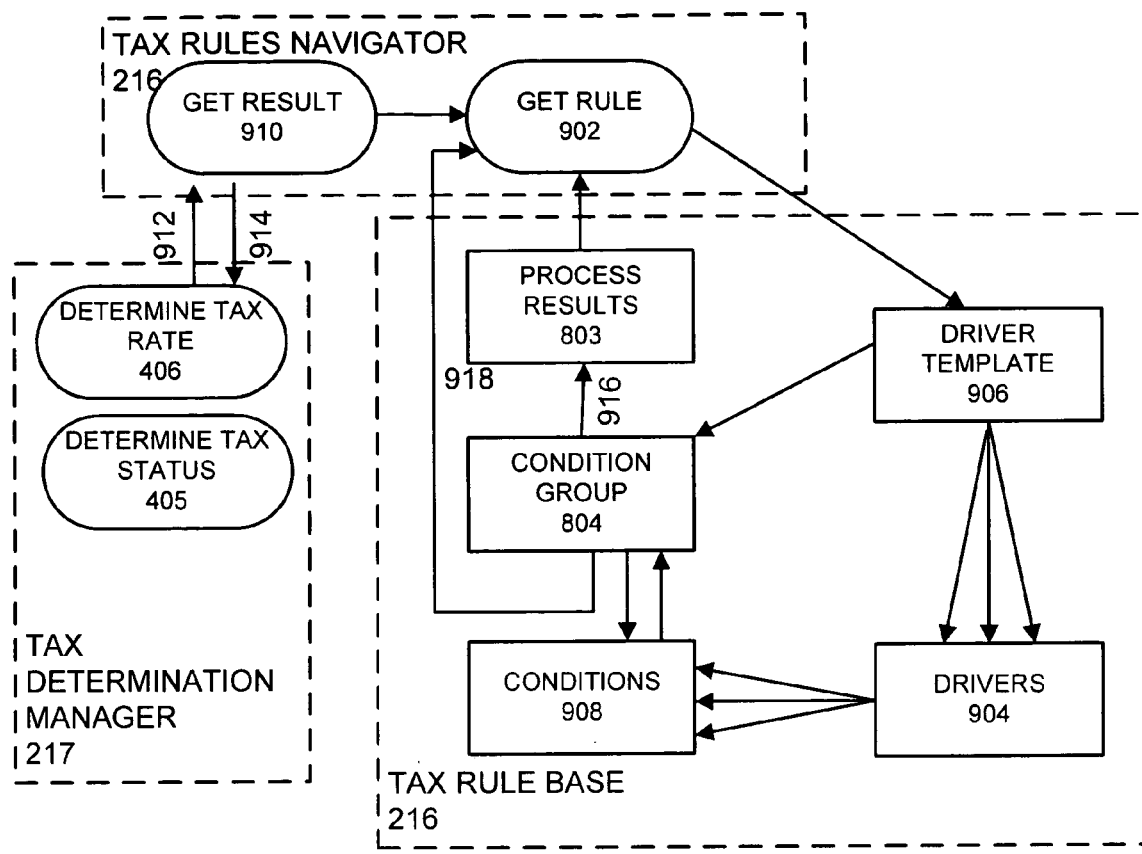
FIG. 9 illustrates how tax rules are applied to a process in accordance with an embodiment of the present invention.
FIG. 10 illustrates exemplary tax rules in accordance with an embodiment of the present invention.

FIG. 9 illustrates how tax rules are applied to a process in accordance with an embodiment of the present invention. During the processing, tax rules navigator 216 gets an internal request 912 from a process such as determine tax rate process 406 of a component such as tax determination manager 217, to get the reference to a tax rate. Note that internal request 912 will qualify the request as to the process (determine tax rate, in this example) and a tax (such as ICMS tax). The tax rules navigator 216 gets a rule from the set of tax rules (box 902) for the process of determine tax rate and the tax of ICMS and an order of precedence of 1. The first rule points to a driver template 906. The first driver template 906 points to a condition group 804, which is specified by a driver template 906. A condition group 804 points to a number of conditions (which were created for the drivers 904 indicated by driver template 906). For each of conditions 908, the value of the corresponding driver 904 from the external business transaction request is used to compare with the value stored along with the condition 908, using the comparison method—also stored with condition 908.

If the comparison succeeds, then the next condition 908 of the next driver 904 of the first condition group 804 is considered. If the comparison succeeds, the next condition 908 is considered till all conditions of the same condition group 804 are satisfied. If all of the conditions are satisfied, then the condition group evaluated successfully, and path 916 is taken to retrieve the appropriate process results 803 which will then return the result to the internal requestor, determine tax rate 406, via path 914. If one of the conditions 908 evaluated unsuccessfully, the next available condition group 804 is considered in the condition group order of precedence and if that condition group evaluated successfully, the appropriate process results associated with that condition group will be returned through path 916, as above. If none of the condition groups associated with the driver template of the first rule evaluated successfully, then the first rule is deemed to have not evaluated successfully. The tax rules navigator then takes path 918 and attempts to fetch the next rule in the order of precedence.

If one of the rules evaluated successfully, then path 916 is taken to retrieve the associated process results. If none of the rules evaluated successfully, the rule navigator returns to the internal requestor without a result. Then, it will be the responsibility of the internal requester, such as determine tax rate 406, to attempt to complete its processing using available defaults or to return an error.

For example, in a "determine applicable tax rate" process, a driver template (and associated with a tax rule) may include a "fiscal classification of ship-to party" driver and a "product type" driver. A set of conditions on these drivers can include: "fiscal classification of ship-to party"="manufacturer", and "product type=paper". A combination such as the one above is a condition group. If each of these conditions in the condition group is satisfied, the condition group is said to be satisfied and the process result specifying an 18% tax rate, for example, that is associated with the condition group can be returned. This indicates that the tax rule (from where the driver template was derived) was successful, and no further rules need to be processed.

Exemplary Rules

FIG. 10 illustrates exemplary tax rules in accordance with an embodiment of the present invention. In this example, there are four rules. Note that each rule is for the "ICMS" tax for Brazil (first column), and that each rule applies to the "tax rate determination" process (second column). Furthermore, each rule is associated with a precedence value, which indicates the order in which the rules are considered for application (third column).

Each rule is also associated with a driver template (fourth column), which specifies which drivers will be compared in the course of using the rule. For example, the first rule has a driver template that specifies a ship-from state (SF), a ship-to state (ST) and a product fiscal classification (PFC). The second rule has a driver template that specifies a ship-from state and a ship-to state. Finally, the third rule has a template that specifies only a product fiscal classification. Note that the precedence ordering typically proceeds from the most specific rule to the most general rule. Also, note that a system (tax) user can configure a driver template 806 to include the drivers 806, 807, etc., that he deems necessary to facilitate efficient configuration and reusability of the driver template in various tax rules, whether for different taxes, or different processes for the same tax.

Figure 11:
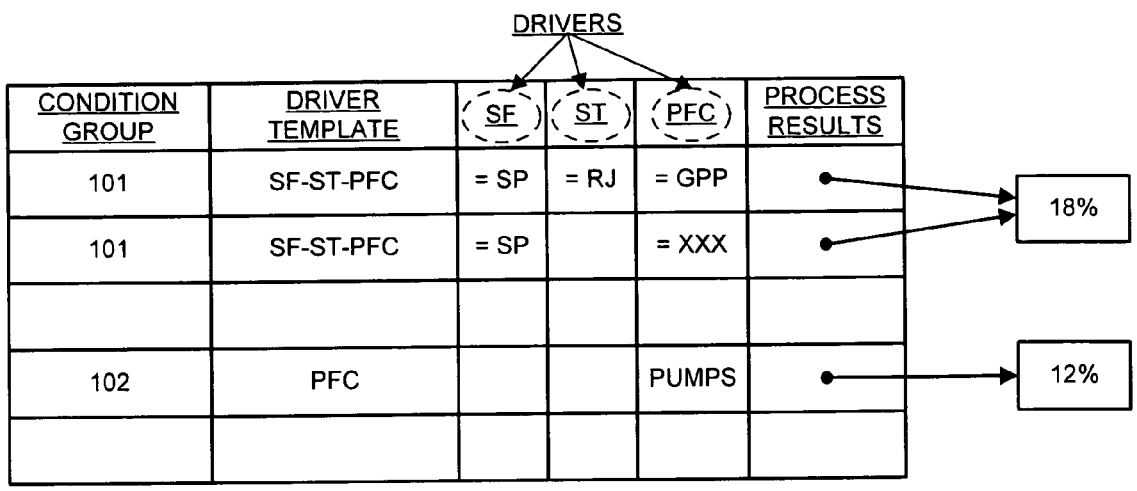
FIG. 11 illustrates how condition groups are related to conditions and process results in accordance with an embodiment of the present invention.

FIG. 11 illustrates how condition groups are related to conditions and process results in accordance with an embodiment of the present invention. Referring to FIG. 10, the first row indicates that a condition group 101 is associated with driver template SF-ST-PFC, and that the rule is satisfied if a number of conditions are satisfied: SF=SP (Sao Paulo), ST=RJ (Rio de Janeiro) and PFC=GPP (Glossy Print Paper). If these conditions are satisfied, the process result points to an 18% tax rate.

Similarly, the second row indicates that the driver template is also SF-ST-PFC and that the rule is satisfied if SF=SP (Sao Paulo), ST=ANY and PFC=XXX. If these conditions are satisfied, the process result also points to an 18% tax rate.

The third row indicates that a condition group 102 is associated with a driver template that specifies a product fiscal classification, and that the rule is satisfied if PFC=Pumps. If this condition is satisfied, the process result points to a 12% tax rate.

Note that a system (tax) user can configure the templates and corresponding conditions based upon the requirements of a given tax and/or subscriber and/or tax process.

Processing Tax Rules

Figure 12:
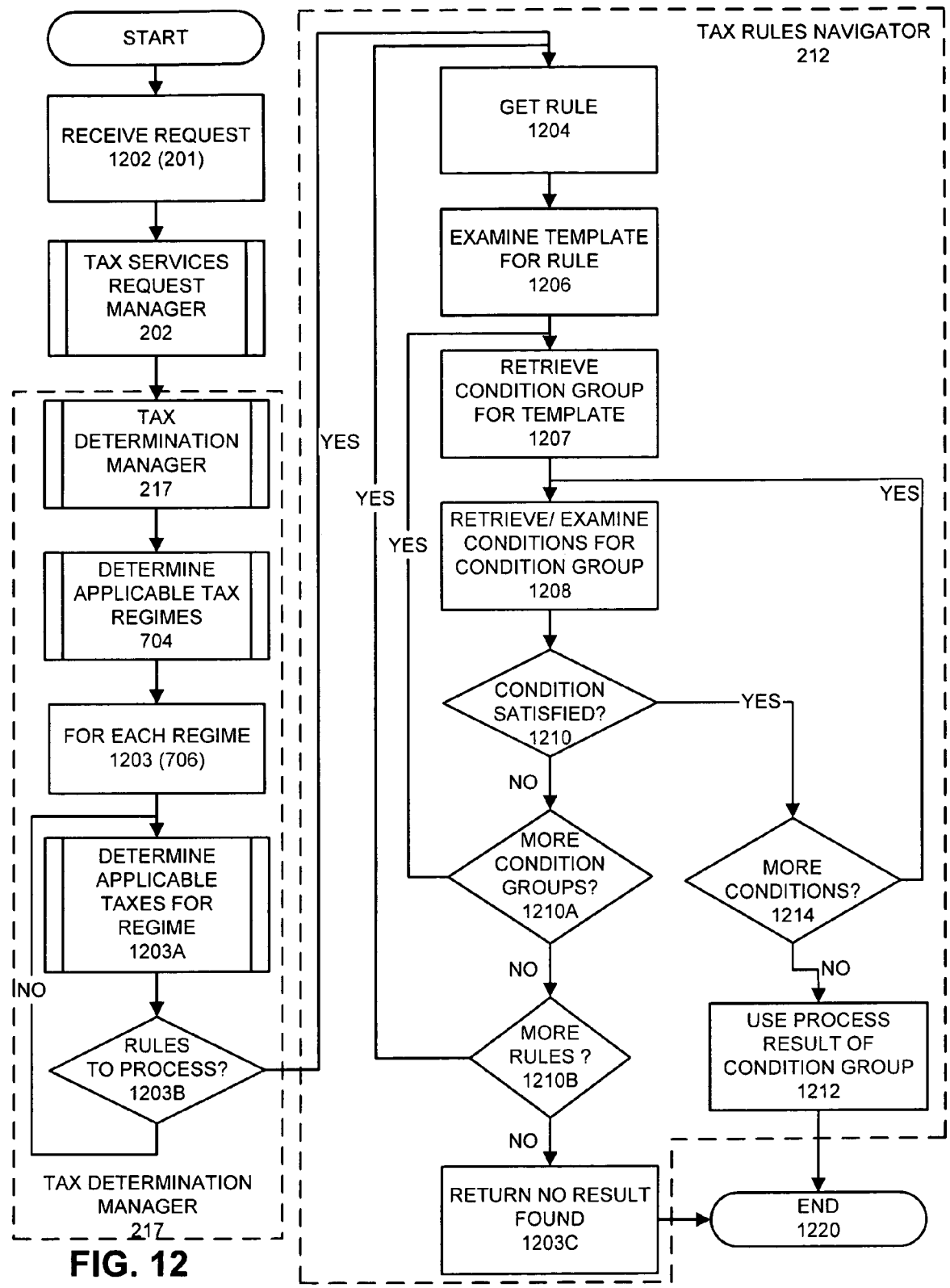
FIG. 12 is a flow chart illustrating how tax rules are processed in accordance with an embodiment of the present invention.

FIG. 12 is a flow chart illustrating how tax rules are processed in accordance with an embodiment of the present invention. In the flow chart illustrates in FIG. 12, steps are represented by rectangular boxes, processes or components are represented by a double-walled rectangular boxes, decision points are represented by a rhombus/parallelograms, and terminators by a rectangular boxes with rounded (semi-circular) ends. The system starts by the tax services request manager 202 receiving a request 201 to process taxes for a transaction (step 1202). Tax services request manager 202 calls tax determination manager 217 with a request to determine applicable regimes. Tax determination manager 217 calls determine applicable tax regimes 406 to determine the regimes that need to be considered. For each regime (step 1203), the tax determination manager 217 calls determine applicable taxes (1203A, 402) to determine first the candidate taxes for the regime. For each candidate tax, determine applicable taxes (1203A, 402) needs to examine if tax rules need to be processed (decision 1203B) to determine the applicability. If no tax rules need to be processed, then determine applicable taxes (1203A, 402) will attempt to decide the applicability based on defaults and settings.

If rules need to be processed (decision 1203B), determine applicable taxes (1203A, 402) calls get rule (step 1204) of the tax rules navigator 212, wherein the system gets a (first) rule from the set of tax rules 710 (step 1204). The system then examines the driver template 804 associated with the rule (step 1206). For the driver template 804 identified by the first rule, the tax rules navigator 212 retrieves the condition groups (created out of that driver template) (step 1207). The system then retrieves and examines conditions (step 1208) associated with each driver in the condition group retrieved in the previous step (step 1207). If the first condition is satisfied (decision 1210), the tax rules navigator 212 checks to see if there are more conditions to examine (decision 1214). If there are more conditions, then the next condition is checked till all conditions are satisfied, i.e., there are no more conditions (decision 1214). Then, the system uses the process result associated with the rule in determining the tax for the transaction (step 1212), and the (current) rule is said to have been "successfully evaluated." At this point the process is complete for the tax rules navigator. The control returns to the calling process (i.e., determine applicable taxes 1203A, 402) and processing continues at the next step (of determining the tax status—step 405).

Otherwise, if a condition is not satisfied (decision 1210), the system determines if there are more condition groups for the template (step 1210A). If so, the system retrieves the next condition group (step 1208) to examine the conditions for the (current) condition group. If there are no more condition groups (decision 1210A), then, the system checks if there are more rules (decision 1210B). If there is another rule that needs to be processed in the next order of precedence, then, processing begins by retrieving the rule (step 1204) and proceeds in this manner till a rule is successfully evaluated and therefore a result can be returned.

Else, if no rule was successful and there are no more rules to process (decision 1210B), then, the tax rules navigator will return to the calling process with a (processing) status of "no result found." It is then the responsibility/prerogative of the calling process (determine applicable taxes 1203A, 402)—to attempt to complete the process using defaults; or to return to its calling process with an error (processing) status.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining taxes for a transaction by applying tax rules specified using configurable templates in a computer system, comprising:
   receiving, by the computer system, the transaction;
   examining a configurable template associated with a tax rule, which specifies the configurable template to use for a tax computation process,
      wherein the configurable template includes one or more drivers embedded in a computer readable medium of the computer system, wherein a driver identifies an attribute which is associated with the transaction and which is an input to the tax computation process, and
      wherein the configurable template identifies one or more condition groups, wherein a condition group is a combination of values and conditions associated with the drivers in the configurable template, and wherein the condition group specifies one or more conditions that must be satisfied for the tax computation process to arrive at a result;
   determining whether each condition in a first condition group is satisfied by comparing the value of the set of attributes associated with the transaction to the value stored with the condition in the driver template;
   responsive to each condition in the first condition group being satisfied, using the result of the tax computation process associated with the first condition group to determine a tax for the transaction;
   responsive to any condition in the first condition group not being satisfied, using the result of the tax computation process associated with a second condition group in order of precedence to determine the tax for the transaction in response to each condition in the second condition group being satisfied; and
   responsive to none of the one or more condition groups identified by the configurable template is satisfied, applying a second tax rule, which specifies a second configurable template for a second tax computation process, in order of precedence in the process of determining the tax for the transaction.

2. The method of claim 1, wherein the order of precedence of the tax rules allows the user to configure the system in a way that more specific tax rules are applied before more general tax rules are applied.

3. The method of claim 1, further comprising allowing a user to modify configurable templates associated with the tax rules.

4. The method of claim 1, wherein the tax rule specifies whether or not a specific tax is applicable to the transaction.

5. The method of claim 1, wherein the tax rule specifies a tax rate that is used in determining the tax amount for a tax applicable to the transaction.

6. The method of claim 1, wherein the tax rule specifies a tax status that is used in determining the tax amount for a tax applicable to the transaction.

7. The method of claim 1, wherein the tax rule specifies a taxable basis formula that is used in determining the tax amount for a tax applicable to the transaction.

8. The method of claim 1, wherein the tax rule specifies a tax calculation formula that is used in determining the tax amount for a tax applicable to the transaction.

9. The method of claim 1, wherein the tax rule specifies a tax recovery rate that is used in determining the tax recovery amount for a tax applicable to the transaction.

10. The method of claim 1, wherein the tax rule specifies a result that is used in determining the outcome of any process of determining or administering taxes that are applicable to the transaction.

11. The method of claim 1, wherein determining the tax for the transaction involves:
    determining which taxes are applicable to the transaction;
    determining a taxable basis for the transaction;
    determining an applicable tax rate for the transaction; and
    calculating the tax for the transaction.

12. The method of claim 1, wherein different sets of tax rules can be associated with different local jurisdictions.

13. The method of claim 1, wherein the tax rule, the configurable template and the conditions first condition group reside in a database.

14. The method of claim 1, wherein the tax rules specified using configurable templates are applied to processes other than determining taxes such as processes of administering taxes.

15. The method of claim 1, wherein the tax rules specified using configurable templates are applied to a few but not all of the processes for determining or administering taxes.

16. The method of claim 1, further comprising creating the tax rules for a hierarchy of tax regimes in such a way as to allow the specification of a general rule for a higher-level regime, and increasingly specific rules down the regime hierarchy to the level of taxes in the lowest level of regime.

17. The method of claim 1, further comprising defining the tax rules for subscribers according to an open subscription model that allows sharing of rules across subscribers in a subscription hierarchy.

18. A computer-readable storage medium storing instructions that when executed by a computer cause the computer to perform a method for determining taxes for a transaction by applying tax rules specified using configurable templates in a computer system, the method comprising:
    receiving, by the computer system, the transaction;
    examining a configurable template associated with a tax rule, which specifies the configurable template to use for a tax computation process,
       wherein the configurable template includes one or more drivers embedded in the computer readable medium, wherein a driver identifies an attribute which is associated with the transaction and which is an input to the tax computation process, and
       wherein the configurable template identifies one or more condition groups, wherein a condition group is a combination of values and conditions associated with the drivers in the configurable template, and wherein the condition group specifies one or more conditions that must be satisfied for the tax computation process to arrive at a result;
    determining whether each condition in a first condition group is satisfied by comparing the value of the set of attributes associated with the transaction to the value stored with the condition in the driver template;
    responsive to each condition in the first condition group being satisfied, using the result of the tax computation process associated with the first condition group to determine a tax for the transaction;

responsive to any condition in the first condition group not being satisfied, using the result of the tax computation process associated with a second condition group in order of precedence to determine the tax for the transaction in response to each condition in the second condition group being satisfied; and responsive to none of the one or more condition groups identified by the configurable template is satisfied, applying a second tax rule, which specifies a second configurable template for a second tax computation process, in order of precedence in the process of determining the tax for the transaction.

19. The computer-readable storage medium of claim 18, wherein the order of precedence of the tax rules causes more specific tax rules to be applied before more general tax rules are applied.

20. The computer-readable storage medium of claim 18, wherein the method further comprises allowing a user to modify configurable templates associated with the tax rules.

21. The computer-readable storage medium of claim 18, wherein the tax rule specifies whether or not a specific tax is applicable to the transaction.

22. The computer-readable storage medium of claim 18, wherein the tax rule specifies a tax rate that is used in determining the tax for the transaction.

23. The computer-readable storage medium of claim 18, wherein the tax rule specifies a tax status that is used in determining the tax amount for a tax applicable to the transaction.

24. The computer-readable storage medium of claim 18, wherein the tax rule specifies a taxable basis formula that is used in determining the tax amount for a tax applicable to the transaction.

25. The computer-readable storage medium of claim 18, wherein the tax rule specifies a tax calculation formula that is used in determining the tax amount for a tax applicable to the transaction.

26. The computer-readable storage medium of claim 18, wherein the tax rule specifies a tax recovery rate that is used in determining the tax recovery amount for a tax applicable to the transaction.

27. The computer-readable storage medium of claim 18, wherein the tax rule specifies a result that is used in determining the outcome of any process of determining or administering taxes that are applicable to the transaction.

28. The computer-readable storage medium of claim 18, wherein determining the tax for the transaction involves:
determining which taxes are applicable to the transaction;
determining a taxable basis for the transaction;
determining an applicable tax rate for the transaction; and
calculating the tax for the transaction.

29. The computer-readable storage medium of claim 18, wherein different sets of tax rules can be associated with different local jurisdictions.

30. The computer-readable storage medium of claim 18, wherein the tax rule, the configurable template and the first condition group reside in a database.

31. The computer-readable storage medium of claim 18 wherein the tax rules specified using configurable templates are applied to processes other than determining taxes such as processes of administering taxes.

32. The computer-readable storage medium of claim 18, wherein the tax rules specified using configurable templates are applied to a few but not all processes for determining or administering taxes.

33. The computer-readable storage medium of claim 18, wherein the method further comprises creating the tax rules for a hierarchy of tax regimes in such a way as to allow the specification of a general rule for a higher-level regime, and increasingly specific rules down the regime hierarchy to the level of taxes in the lowest level of regime.

34. The computer-readable storage medium of claim 18, wherein the method further comprises defining the tax rules for subscribers according to an open subscription model that allows sharing of rules across subscribers in a subscription hierarchy.

\* \* \* \* \*

UNITED STATES PATENT AND TRADEMARK OFFICE
CERTIFICATE OF CORRECTION

| | | |
|---|---|---|
| PATENT NO. | : 7,647,258 B2 | Page 1 of 1 |
| APPLICATION NO. | : 10/617327 | |
| DATED | : January 12, 2010 | |
| INVENTOR(S) | : Isaac J. William et al. | |

It is certified that error appears in the above-identified patent and that said Letters Patent is hereby corrected as shown below:

On the title page, item (75), in column 1, in "Inventors", line 3, delete "Hayward," and insert -- Foster City, --, therefor.

On the Title Page:

The first or sole Notice should read --

Subject to any disclaimer, the term of this patent is extended or adjusted under 35 U.S.C. 154(b) by 1523 days.

In the drawings:
On sheet 2 of 9, in Figure 3, Ref. Numeral 309, line 2, delete "SUBCRIBER" and insert -- SUBSCRIBER --, therefor.

In column 3, line 26-30, delete "This embodiment enables a user to avoid repeating rules which are generic for every tax. Instead, the user only define rules which are specific to a given tax and/or tax status, or a given tax and tax recovery type, for example at the lowest level." and insert the same after "regime." on Col. 3, Line 25 as a continuation of the same paragraph.

In column 18, line 23, in claim 13, after "the" delete "conditions".

Signed and Sealed this

Nineteenth Day of October, 2010

David J. Kappos
*Director of the United States Patent and Trademark Office*